(12) United States Patent
Park et al.

(10) Patent No.: US 10,730,147 B2
(45) Date of Patent: Aug. 4, 2020

(54) METHOD OF FORMING PATTERN FOR A LARGE AREA LIQUID CRYSTAL DEVICE

(71) Applicant: LG CHEM, LTD., Seoul (KR)

(72) Inventors: Jeong Ho Park, Daejeon (KR); Jin Soo Lee, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/349,254

(22) PCT Filed: Nov. 10, 2017

(86) PCT No.: PCT/KR2017/012753
§ 371 (c)(1),
(2) Date: May 10, 2019

(87) PCT Pub. No.: WO2018/088853
PCT Pub. Date: May 17, 2018

(65) Prior Publication Data
US 2019/0271868 A1     Sep. 5, 2019

(30) Foreign Application Priority Data
Nov. 11, 2016    (KR) .................. 10-2016-0150575

(51) Int. Cl.
| | |
|---|---|
| *B23K 26/57* | (2014.01) |
| *B32B 9/00* | (2006.01) |
| *B32B 27/06* | (2006.01) |
| *B32B 38/10* | (2006.01) |
| *B32B 43/00* | (2006.01) |
| *G02F 1/1333* | (2006.01) |

(Continued)

(52) U.S. Cl.
CPC .......... *B23K 26/57* (2015.10); *B23K 26/0622* (2015.10); *B23K 26/351* (2015.10); *B23K 26/352* (2015.10); *B23K 26/356* (2015.10); *B23K 26/359* (2015.10); *B23K 26/36* (2013.01); *B23K 26/362* (2013.01); *B23K 26/364* (2015.10); *B23K 26/55* (2015.10); *B32B 9/005* (2013.01); *B32B 27/06* (2013.01); *B32B 27/28* (2013.01); *B32B 27/32* (2013.01); *B32B 27/36* (2013.01); *B32B 38/10* (2013.01); *B32B 43/00* (2013.01); *B32B 43/006* (2013.01); *G02F 1/1337* (2013.01); *G02F 1/1339* (2013.01); *G02F 1/13439* (2013.01); *G02F 1/133305* (2013.01); *H01B 5/14* (2013.01); *B32B 2457/202* (2013.01)

(58) Field of Classification Search
None
See application file for complete search history.

(56) References Cited

U.S. PATENT DOCUMENTS

| | | | |
|---|---|---|---|
| 4,937,129 A | 6/1990 | Yamazaki | |
| 6,031,201 A * | 2/2000 | Amako | B23K 26/067 219/121.68 |
| 6,399,258 B2 | 6/2002 | O'Brien et al. | |
| 2002/0139786 A1 | 10/2002 | Amako et al. | |

(Continued)

FOREIGN PATENT DOCUMENTS

| | | |
|---|---|---|
| EP | 0 656 241 A1 | 6/1995 |
| JP | 6-45483 B2 | 6/1994 |

(Continued)

*Primary Examiner* — Jiong-Ping Lu
(74) *Attorney, Agent, or Firm* — Dentons US LLP (57) ABSTRACT

The present invention relates to a pattern forming method of a liquid crystal device.

11 Claims, 9 Drawing Sheets

(51) Int. Cl.

| | |
|---|---|
| G02F 1/1337 | (2006.01) |
| G02F 1/1339 | (2006.01) |
| B32B 27/32 | (2006.01) |
| H01B 5/14 | (2006.01) |
| B32B 27/36 | (2006.01) |
| G02F 1/1343 | (2006.01) |
| B23K 26/351 | (2014.01) |
| B32B 27/28 | (2006.01) |
| B23K 26/364 | (2014.01) |
| B23K 26/36 | (2014.01) |
| B23K 26/362 | (2014.01) |
| B23K 26/359 | (2014.01) |
| B23K 26/352 | (2014.01) |
| B23K 26/356 | (2014.01) |
| B23K 26/55 | (2014.01) |
| B23K 26/0622 | (2014.01) |

(56) References Cited

U.S. PATENT DOCUMENTS

| | | | |
|---|---|---|---|
| 2008/0087629 A1* | 4/2008 | Shimomura | B23K 26/0661 216/11 |
| 2011/0026236 A1 | 2/2011 | Kondo et al. | |
| 2014/0094079 A1 | 4/2014 | Ito et al. | |

FOREIGN PATENT DOCUMENTS

| | | |
|---|---|---|
| JP | 2003-154478 A | 5/2003 |
| JP | 2009-122565 A | 6/2009 |
| JP | 2014-71231 A | 4/2014 |
| KR | 10-2007-0080835 A | 8/2007 |
| KR | 10-0838344 B1 | 6/2008 |
| KR | 10-2010-0110447 A | 10/2010 |
| KR | 10-2011-0060265 A | 6/2011 |
| KR | 10-2015-0029395 A | 3/2015 |
| KR | 10-1558320 B1 | 10/2015 |
| KR | 10-2016-0049330 A | 5/2016 |
| WO | 2009/128359 A1 | 10/2009 |

\* cited by examiner

Example 7

Example 8

[Figure 16]

Beam dia. 5 mm

Beam dia. 7mm

[Figure 17]

METHOD OF FORMING PATTERN FOR A LARGE AREA LIQUID CRYSTAL DEVICE

The present application is a National Phase entry pursuant to 35 U.S.C. § 371 of International Application No. PCT/KR2017/012753 filed on Nov. 10, 2017, and claims priority to and the benefit of Korean Patent Application No. 10-2016-0150575 filed in the Korean Intellectual Property Office on Nov. 11, 2016, the entire contents of which are incorporated herein by reference in their entirety.

FIELD

The present invention relates to a method of forming pattern for a large area liquid crystal device.

BACKGROUND

Studies on a liquid crystal device which is applicable to a flexible electronic device product such as a display, a smart window, or a sunroof are ongoing.

Specifically, a liquid crystal device includes a configuration in which a conductive layer is introduced above a substrate and a dielectric film, a liquid crystal alignment film having an electrical or electro-optical function, a gap spacer, etc are provided above and below the conductive layer. Further, the liquid crystal devices which are provided above and below the liquid crystal are manufactured by a roll-to-roll (R2R) based continuous process of the related art.

The conductive layer which is included in the liquid crystal device is provided with a metal oxide layer which is transparent, and has conductivity above the substrate, to form an electrical field for controlling an alignment of liquid crystal. The liquid crystal alignment film may impart an alignment function to the liquid crystal.

In the step of processing the liquid crystal device according to the purpose of products, processes such as electrical short-circuiting and cutting are also important, but a process of imparting adhesiveness and durability to the liquid crystal device provided above/below the liquid crystal is particularly important.

Further, in order to seal upper and lower liquid crystal devices above and below the liquid crystal, the liquid crystal alignment film has excellent adhesiveness, with a sealant provided between the upper and lower liquid crystal devices. However, when the liquid crystal alignment film does not have excellent adhesiveness with the sealant, a process of exposing the substrate by selectively removing the liquid crystal alignment film and the conductive layer is additionally required.

This is an inconvenient process in that a removal process such as photolithography, inkjet, and slot die (including an etching paste) methods of the related art need to ensure an overlay precision of the conductive layer and the liquid crystal alignment film above the substrate. Further, there is a problem in that a cost of the facility for increasing a size is increased.

Therefore, a process of separating the liquid crystal alignment film and the conductive layer with an etching process using a Galvano scanner and a laser beam which is focused with a diameter of several tens of micrometers has been tried. However, in this case, there were problems in that a removed cross-section is not smooth, residues are increased, and production speed is slow.

Therefore, studies on a manufacturing method of a liquid crystal display from which one area of the liquid crystal alignment film and the conductive layer is removed with a high quality while ensuring a process economic efficiency through a relatively simple process are required. Related Art Document: Korean Patent Application No. 10-2007-0030147

DETAILED DESCRIPTION OF THE INVENTION

The present invention has been made in an effort to provide a pattern forming a method of forming patterns for a large area liquid crystal device.

However, technical problems of the present invention are not limited to the above-mentioned technical problems, and other technical problems, which are not mentioned above, can be clearly understood by those skilled in the art from the following descriptions.

SUMMARY

An exemplary embodiment of the present invention provides a method of forming patterns for a large area liquid crystal device, comprising: preparing a large area liquid crystal device which includes a substrate, a conductive layer provided on the substrate, and a liquid crystal alignment film provided on the conductive layer; and exposing one area of the substrate by delaminating one area of the conductive layer and the liquid crystal alignment film by irradiating a laser to the large area liquid crystal device; wherein the laser is irradiated from the liquid crystal alignment film toward the conductive layer and the laser is a Q switching IR laser having a beam diameter of 1 mm or larger and 16 mm or smaller and an energy per pulse of 0.05 J or higher and 2.5 J or lower.

According to one exemplary embodiment of the present invention, a speed of a process of separating a liquid crystal alignment film and a conductive layer of a liquid crystal device is improved while minimizing damage of a substrate by irradiating a laser having a high energy, to improve productivity.

DETAILED DESCRIPTION

In the specification, unless explicitly described to the contrary, the word "comprise or include" and variations such as "comprises or includes" or "comprising or including", will be understood to imply the inclusion of stated elements but not the exclusion of any other elements.

In the specification, when specific numerical characters on the drawing are denoted by "A/B", it means that A and B are sequentially provided, and specifically, B is provided on A.

Hereinafter, the present specification will be described in more detail.

An exemplary embodiment of the present invention provides a method of forming patterns for a large area liquid crystal device, comprising: preparing a large area liquid crystal device which includes a substrate, a conductive layer provided on the substrate, and a liquid crystal alignment film provided on the conductive layer; and exposing one area of the substrate by delaminating one area of the conductive layer and the liquid crystal alignment film by irradiating a laser onto the large area liquid crystal device; wherein the laser is irradiated from the liquid crystal alignment film toward the conductive layer and the laser is a Q switching IR laser having a beam diameter of 1 mm or larger and 16 mm or smaller and an energy per pulse of 0.05 J or higher and 2.5 J or lower.

Figure 1:
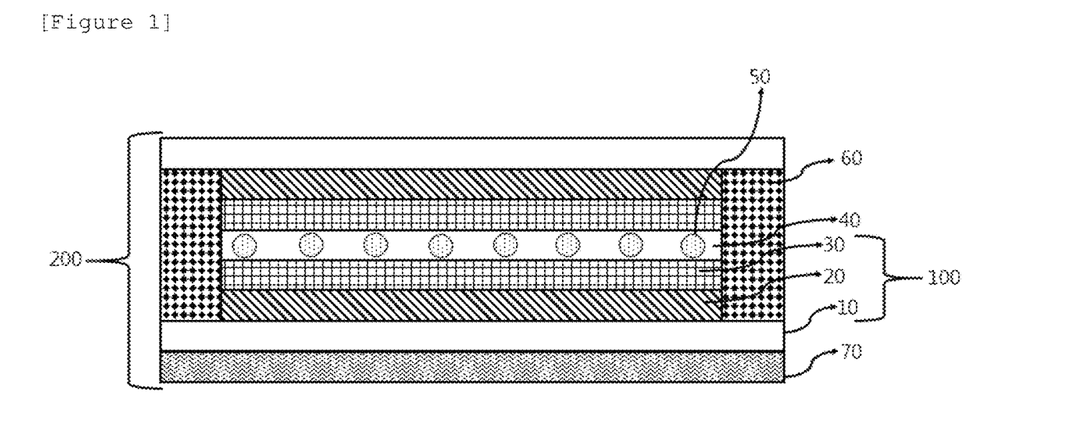
FIG. 1 illustrates a schematic diagram of a display device to which a liquid crystal device according to an exemplary embodiment of the present invention is applied.

A schematic diagram of a display device 200 to which a large area liquid crystal device on which a pattern is formed according to an exemplary embodiment of the present invention is applied is illustrated in FIG. 1.

Referring to FIG. 1, upper and lower large area liquid crystal devices 100 including a substrate 10 in which one area of the conductive layer 20 and the liquid crystal alignment film 30 is delaminated so that one area is exposed are prepared, and a sealant 60 is interposed on the base substrate of the upper large area liquid crystal device and the lower large area liquid crystal device in which one area is exposed to seal the upper large area liquid crystal device and the lower large area liquid crystal device.

Further, a liquid crystal 40 and a spacer 50 may be interposed on the conductive layer 20 and the liquid crystal alignment film 30 from which the one area is not removed, between the upper large area liquid crystal device and the lower large area liquid crystal device. Further, a polarizer 70 may be provided on one surface of one of the bonded upper large area liquid crystal device and lower large area liquid crystal device.

A method of forming patterns for a large area liquid crystal device according to an exemplary embodiment of the present invention includes a step of preparing a large area liquid crystal device which includes a substrate, a conductive layer provided on the substrate, and a liquid crystal alignment film provided on the conductive layer.

According to an exemplary embodiment of the present invention, the large area liquid crystal device may include a substrate.

According to the exemplary embodiment of the present invention, the base substrate may be a polycarbonate (PC) film, a colorless polyimide film, a polyethylene terephthalate film, or a cyclo olefin polymer film. However, the base substrate is not limited thereto, but may be freely selected from polymers having a bending property and high adhesiveness with a sealant known in the art.

According to an exemplary embodiment of the present invention, the large area liquid crystal device includes the substrate so that mechanical durability and structural flexibility of a large area liquid crystal device may be ensured. Specifically, the large area liquid crystal device includes the substrate so that a bending property is implemented.

According to an exemplary embodiment of the present invention, a thickness of the substrate may be 40 μm or larger and 200 μm or smaller, specifically, 70 μm or larger and 200 μm or smaller, 40 μm or larger and 150 μm or smaller, or 70 μm or larger and 150 μm or smaller. More specifically, the thickness of the substrate may be 90 μm or larger and 150 μm or smaller, 70 μm or larger and 130 μm or smaller, or 90 μm or larger and 130 μm or smaller. However, the thickness is not limited thereto and may be freely adjusted according to a property of a product to which the large area liquid crystal device is applied.

According to an exemplary embodiment of the present invention, the large area liquid crystal device may include a conductive layer provided on the substrate. The conductive layer may form an electric field for controlling an alignment of the liquid crystal which may be applied on the liquid crystal alignment film and have electrical conductivity which may transfer charges supplied from the outside, and have a high surface energy.

According to an exemplary embodiment of the present invention, the conductive layer may be an indium tin oxide (ITO) film. However, the conductive layer is not limited thereto. A conductive layer, which may form an electric field to control the alignment of the liquid crystal, supply charges, and is known in the art, may be selected without limitation. Further, the conductive layer may have transparency and the transparency may be attained by applying various materials and methods of forming known in the art.

According to an exemplary embodiment of the present invention, a thickness of the conductive layer may be 20 nm or larger and 100 nm or smaller, specifically, 30 nm or larger and 100 nm or smaller, 20 nm or larger and 80 nm or smaller, or 30 nm or larger and 80 nm or smaller. More specifically, the thickness of the conductive layer may be 40 nm or larger and 80 nm or smaller, 30 nm or larger and 70 nm or smaller, or 40 nm or larger and 70 nm or smaller. However, the thickness is not limited thereto and may be freely adjusted according to a property of a product to which the large area liquid crystal device is applied.

The thickness of the conductive layer is much smaller than the thickness of the substrate so that damage to the substrate may be minimized by appropriately adjusting a condition of the laser which is irradiated during a process of separating the liquid crystal alignment film and the conductive layer.

According to an exemplary embodiment of the present invention, the large area liquid crystal device may include a liquid crystal alignment film provided on the conductive layer. The large area liquid crystal device includes the liquid crystal alignment film on the conductive layer so that alignment of the liquid crystal provided on the liquid crystal alignment film may be controlled.

According to an exemplary embodiment of the present invention, the liquid crystal alignment film may include at least one of a photo alignment film and a rubbing alignment film. Further, the liquid crystal alignment film may have a structure in which the photo alignment film and the rubbing alignment film are stacked.

Specifically, the photo alignment film may control alignment of the liquid crystal applied on the liquid crystal alignment film by irradiating light. Further, the rubbing alignment film may control the alignment of the liquid crystal applied on the liquid crystal alignment film by a rubbing process which rotates a roller on the liquid crystal alignment film.

According to the exemplary embodiment of the present invention, the photo alignment film may include a photo aligning compound. The photo aligning compound may be aligned to have directivity. Further, as the photo aligning compound, a compound which is orientationally ordered in a predetermined direction by irradiating light and aligns adjacent liquid crystal compounds in an aligned state in a predetermined direction and is known in the art may be selected without limitation.

According to an exemplary embodiment of the present invention, the rubbing alignment film may be aligned to have directivity. Further, the rubbing alignment film may include a material which is aligned in a predetermined direction through a rubbing process, aligns adjacent liquid crystal compounds in the aligned state in a predetermined direction, and is known in the art without limitation.

According to an exemplary embodiment of the present invention, the liquid crystal alignment film may include at least one of a monomolecular compound, a monomeric compound, an oligomeric compound, and a polymeric compound. However, the liquid crystal alignment film is not limited thereto and may be freely selected from compounds which can control the alignment of the liquid crystal and is known in the art.

According to an exemplary embodiment of the present invention, a thickness of the liquid crystal alignment film may be 0.1 mm or larger and 1 mm or smaller, 0.1 mm or larger and 0.5 or smaller, 0.3 or larger and 1 mm or smaller, or 0.3 mm or larger and 0.5 mm or smaller. However, the thickness is not limited thereto and may be freely adjusted according to a property of a product to which the large area liquid crystal device is applied.

Since a thickness range of the liquid crystal alignment film is relatively larger than the above-described thickness of the conductive layer, only when a condition of a laser which is irradiated during a process of delaminating the liquid crystal alignment film and the conductive layer by irradiating the laser is appropriately adjusted, the liquid crystal alignment film and the conductive layer may be delaminated and the damage of the substrate may be minimized.

According to an exemplary embodiment of the present invention, the method of forming patterns for the large area liquid crystal device includes a step of exposing one area of the substrate by delaminating one area of the conductive layer and the liquid crystal alignment film by irradiating laser onto the large area liquid crystal device.

According to an exemplary embodiment of the present invention, the laser may irradiate from the liquid crystal alignment film toward the conductive layer.

According to an exemplary embodiment of the present invention, a beam diameter of the laser may be 1 mm or larger and 16 mm or smaller, 1 mm or larger and 9 mm or smaller, 1 mm or larger and 8 mm or smaller, 4 mm or larger and 16 mm or smaller, 4 mm or larger and 9 mm or smaller, 4 mm or larger and 8 mm or smaller, 5 mm or larger and 16 mm or smaller, 5 mm or larger and 9 mm or smaller, or 5 mm or larger and 8 mm or smaller.

Within the above range, efficiency of a pattern forming process of a large area liquid crystal device may be improved while minimizing damage of the substrate and increasing a separating process speed. Specifically, when the beam diameter does not reach the above range, the irradiating laser is excessively overlapped which causes damage to the substrate and a decrease of a delaminated area so that it is difficult to perform delamination at high speed. Further, when the beam diameter exceeds the range, a pulse energy density of the irradiating laser is decreased so that the liquid crystal alignment film and the conductive layer are not sufficiently delaminated.

Further, the beam diameter of the laser may be adjusted by providing a lens between the large area liquid crystal device and the laser. When the diameter of the laser beam is adjusted using the lens, it is necessary to consider an energy density according to a diameter of the beam. Further, since the energy density of the irradiating laser may vary according to adhesiveness between a material to be separated and the base substrate, a process of optimizing a delaminating property according to a speed of a delaminating process and the energy density may be desired.

According to an exemplary embodiment of the present invention, an energy per a purse of the laser may be 0.05 J or higher and 2.5 J or lower, 0.05 J or higher and 1.5 or lower, 0.3 J or higher and 2.5 J or lower, or 0.3 J or higher and 1.5 J or lower.

Within the above-described range, the liquid crystal alignment film and the conductive layer may be delaminated while minimizing damage of the substrate. Specifically, when the energy per pulse of the laser is lower than the above-described range, the liquid crystal alignment film and the conductive layer are not sufficiently delaminated and when the energy per pulse of the laser exceeds the above-described range, the substrate may be damaged due to excessive energy.

According to an exemplary embodiment of the present invention, the laser may be a Q switching IR laser.

In the present specification, Q switching refers to one of the techniques for creating a laser light pulse output beam. According to the Q switching method, a laser resonator is excited to a state when a Q value of the laser resonator is reduced to accumulate a sufficient energy in a laser medium and then when the Q value is rapidly increased, oscillation starts so that the accumulated energy is discharged as a quick and sharp light pulse. Further, the Q switching method may be used to obtain a light pulse having a high peak output and a narrow width.

Further, when the Q switching is used for a glass laser or carbon dioxide ($CO_2$) laser, a high energy output may be obtained.

According to an exemplary embodiment of the present invention, the laser may be a laser obtained by applying the Q switching to a Nd:YAG (neodymium-doped yttrium aluminum garnet) laser.

According to an exemplary embodiment of the present invention, the laser may be an IR laser. Specifically, a wavelength of the laser may be 1064 nm.

In the specification, the IR laser may refer to a laser having a wavelength of an irradiating laser in an infrared (IR) range.

According to an exemplary embodiment of the present invention, the laser may be irradiate using a normal objective lens such that an energy density of the laser which is irradiated to the large area liquid crystal device per unit area may be 1.0 $J/cm^2$ or higher and 3.0 $J/cm^2$ or lower. When the above-mentioned energy density per unit area is satisfied, the conductive layer and the liquid crystal alignment film may be sufficiently delaminated.

However, the energy density of the laser per unit area may vary according to a type of a substrate on which the conductive layer is provided. For example, when the conductive layer including ITO is formed on a COP film substrate, the energy density of the laser may be 1.1 $J/cm^2$ or higher. When a conductive layer including ITO is formed on a PET film substrate, the energy density of the laser may be 2.1 $J/cm^2$ or higher.

According to an exemplary embodiment of the present invention, a repetition frequency of the laser may be 1 Hz or higher or 10 Hz or lower.

Within the above-described range, a high process speed of the pattern forming process of the large area liquid crystal device may be implemented. That is, according to the range of the repetition frequency, a collision frequency of an irradiating laser per hour is relatively low. However, a laser having a high energy is intermittently irradiates to minimize a time taken to separate the conductive layer and the liquid crystal alignment film.

In the specification, the term "repetition frequency of laser" may refer to a frequency of laser which oscillates or stops in time, that is, the number of collisions per time with an irradiated object of laser.

According to an exemplary embodiment of the present invention, a pulse width of the laser may be 1.0 ns or longer and 10.0 ns or shorter, 1.0 ns or longer and 8.0 ns or shorter, 5.0 ns or longer and 10.0 ns or shorter, or 6.0 ns or longer and 8.0 ns or shorter.

Within the above-described range, the liquid crystal alignment film and the conductive layer may be delaminated while minimizing damage of the substrate. Specifically, within the above-described range, a thermal energy by laser irradiation is smoothly transferred so that the liquid crystal alignment film and the conductive layer may be rapidly delaminated.

In the specification, the term "pulse width of laser" may refer to an interval of time at which an amplitude is half at a rising time and a falling time of the pulse laser which oscillates and stops in time.

Figure 2:
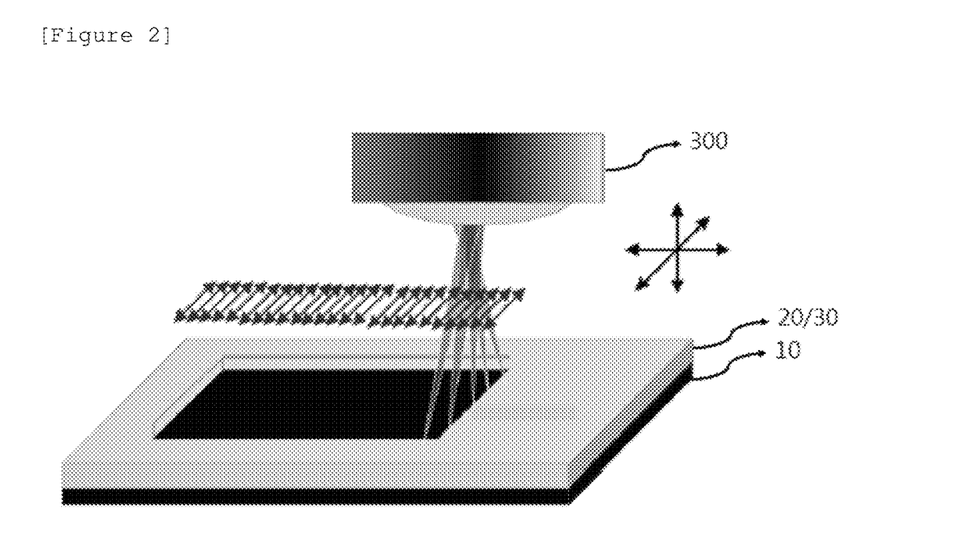
FIG. 2 schematically illustrates a method of forming patterns for a liquid crystal device of the related art.

FIG. 2 schematically illustrates a method of forming patterns for a liquid crystal device of the related art. Referring to FIG. 2, according to the related art method, a laser having a power of several tens of Watts is focused to a large area liquid crystal device 100 in which a substrate 10, a conductive layer 20, and a liquid crystal alignment film 30 are sequentially provided to rapidly scan a laser 300 having a beam diameter of several tens of μm with a high repetition frequency to repeatedly hatch through overlapping between local areas.

Figure 3:
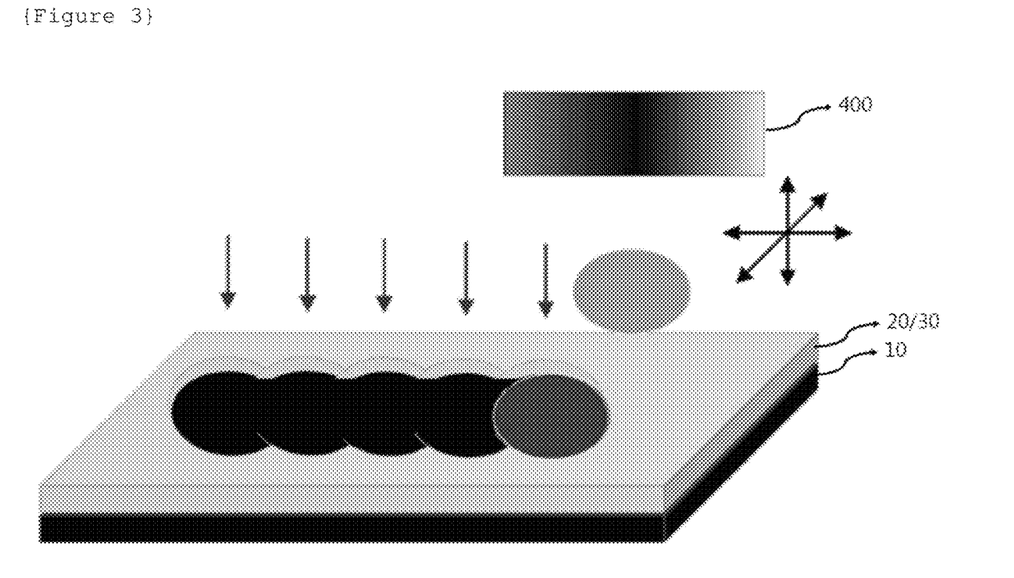
FIG. 3 schematically illustrates a method of forming patterns for a large area liquid crystal device according to an exemplary embodiment of the present invention.

FIG. 3 schematically illustrates a method of forming patterns for a large area liquid crystal device according to an exemplary embodiment of the present invention.

Specifically, referring to FIG. 3, differently from the related art method, a method of forming patterns for a large area liquid crystal device according to an exemplary embodiment of the present invention irradiates a laser 400 having a beam diameter of a relatively large mm unit and a higher energy per pulse to a large area liquid crystal device 100 in which a substrate 10, a conductive layer 20, and a liquid crystal alignment film 30 are sequentially provided to delaminate a large area at one time, so that it is advantageous for rapid delamination.

Figure 4:
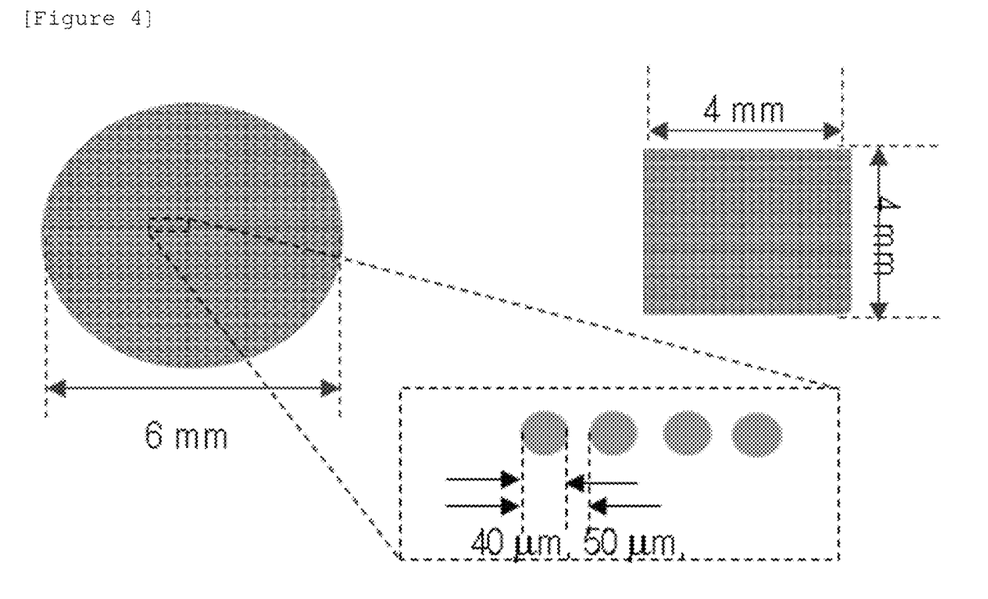
FIG. 4 illustrates a laser irradiating method in a method of forming for a liquid crystal device of the related art.

Further, FIG. 4 illustrates a laser irradiating method in a method of forming patterns for a liquid crystal device of the related art. Specifically, FIG. 4 illustrates one of the methods known in the related art as one example.

Referring to FIG. 4, in order to delaminate the conductive layer and the liquid crystal alignment film formed on a circular substrate having a diameter of 6 mm, the delamination process is performed with a high repetition frequency of 40 kHz, a high scanning velocity of 2000 mm/s, and a small laser beam diameter of 40 μm. In this case, a time (tact time) taken to perform a process of forming a pattern in a large area liquid crystal device was calculated to be 0.37 s. Further, experimentally, the tact time was 1.06 s when the laser is irradiated in a parallel direction and was 0.52 s when the laser is irradiated in bidirectionally crossing directions.

Further, when the delaminating process was performed on the conductive layer and the liquid crystal alignment film formed on a square substrate having one side of 4 mm in length under the same condition, the tact time was calculated to be 0.21 s. Further, experimentally, the tact time was 0.63 s when the laser was irradiated in a parallel direction and was 0.32 s when the laser was irradiated in bidirectionally crossing directions.

In the meantime, a difference between the experimental value and the calculated value is caused by inertia, an acceleration/reduction speed interval, a hatching interval, and direction setting according to an operation of a driving Galvano mirror of a laser irradiating device.

Figure 5:
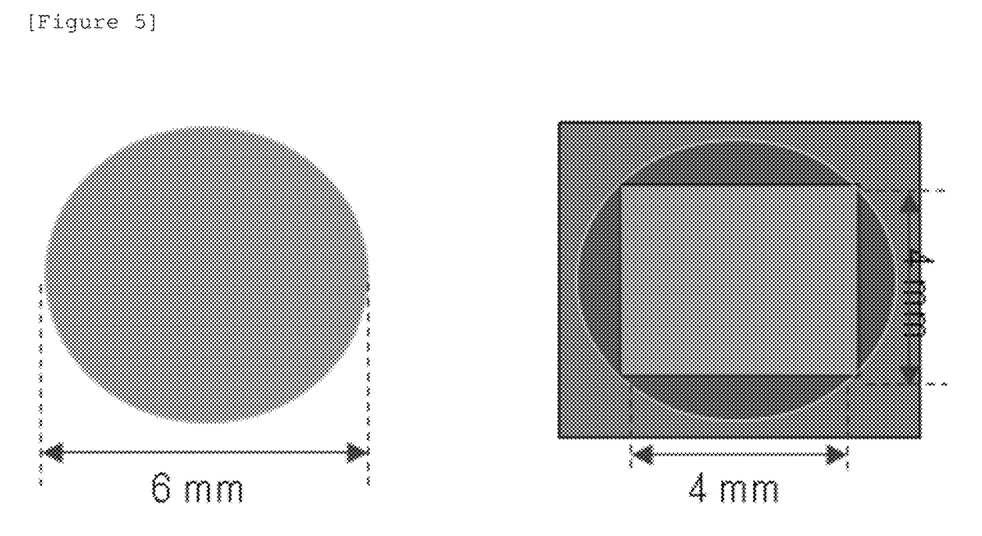
FIG. 5 illustrates a laser irradiating method of forming patterns for a liquid crystal device according to an exemplary embodiment of the present invention.

FIG. 5 illustrates a laser irradiating method in an exemplary embodiment of the present invention. FIG. 5 illustrates one example of a method of forming patterns for a large area liquid crystal device according to an exemplary embodiment of the present invention.

Referring to FIG. 5, according to method of forming patterns according to an exemplary embodiment of the present invention, in order to delaminate the conductive layer and the liquid crystal alignment film formed on the substrate, the delaminating process is performed with a laser having a low repetition frequency of 10 Hz and a large laser beam diameter of 6 mm.

In this case, both the tact time for a circular substrate having a diameter of 6 mm and the tact time for the square substrate having one side of 4 mm in length are 0.1 s.

Therefore, the method of forming patterns for a liquid crystal device according to an exemplary embodiment of the present invention may advantageously secure a processing speed which is significantly faster than that of the related art.

Further, the method of forming patterns for a large area liquid crystal device according to an exemplary embodiment of the present invention may advantageously secure a high processing speed even when a liquid crystal device having various surface shapes is manufactured.

Figure 6:
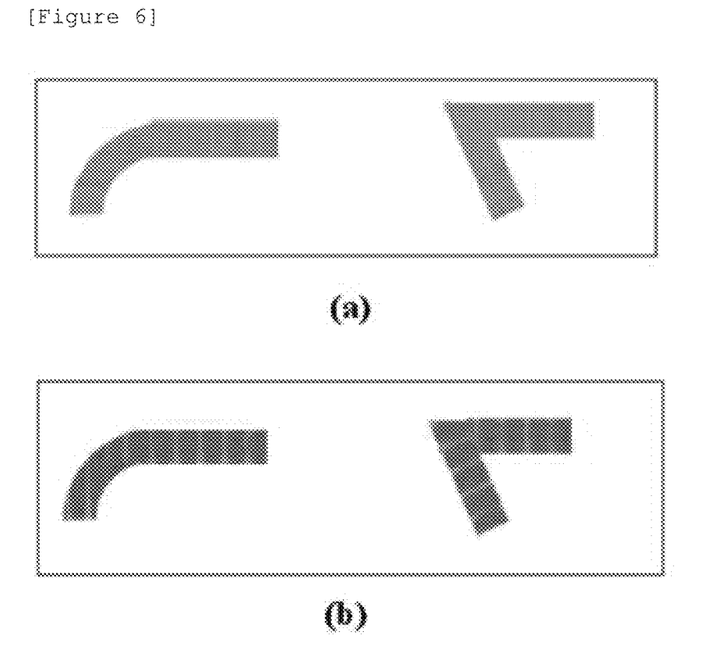
FIG. 6 illustrates a difference of a laser irradiating method in a method of forming patterns of the related art and a method of forming patterns according to an exemplary embodiment of the present invention in accordance with various surface shapes of a liquid crystal device.

FIG. 6 illustrates a difference of a laser irradiating method in a method of forming patterns according to the related art and a method of forming patterns according to an exemplary embodiment of the present invention in accordance with various surface shapes of a liquid crystal device.

Referring to FIG. 6A, it is confirmed that according to the method of forming patterns of the related art, the laser needs to be irradiated onto a liquid crystal device having a large angle of a curved line and an intersection line several times or more, and a delaminating direction needs to be changed several times, therefore it takes a long time for the delaminating process.

In contrast, referring to FIG. 6B, it is confirmed that the delaminating process may be relatively easily performed by irradiating the laser several times according to the method of forming patterns of the exemplary embodiment of the present invention.

According to the exemplary embodiment of the present invention, the step of exposing one area of the substrate may be performed by volume expansion.

According to the exemplary embodiment of the present invention, the step of exposing one area of the substrate is performed with volume expansion driven delamination of the conductive layer from the substrate.

Specifically, in the step of exposing one area of the substrate, the conductive layer is delaminated from the substrate due to volume expansion so that the conductive layer and the liquid crystal alignment film provided on the conductive layer are separated from the substrate.

When the laser is irradiated to the large area liquid crystal device, the substrate transmits the laser and the conductive layer may absorb the laser.

As the conductive layer absorbs the laser, volume expansion occurs due to instantaneous thermal energy supply and the conductive layer may be delaminated from the substrate by the volume expansion.

When the laser is irradiating the conductive layer provided on the substrate, the energy of the irradiating laser is absorbed by the conductive layer and thus a temperature of the conductive layer instantaneously rises, so that rapid thermal expansion of the conductive layer results.

Thermal elastic force of the conductive layer is generated due to the thermal expansion, and the thermal elastic force acts as a force for separating the conductive layer from the substrate. The conductive layer is mainly coupled to the substrate by a Van Der Vaals forces. As soon as the thermal electric force exceeds the Van Der Vaals forces, the conductive layer may be delaminated from the substrate.

A delaminating force caused by the thermal elastic force is proportional to an intensity of the energy of the irradiating laser and is inversely proportional to a square of a pulse width of the irradiating laser, as represented in the following Equation 1. That is, the delaminating force varies depending on how fast a laser having high energy is irradiating, rather than an absolute value of the thermal expansion, so that the shorter the pulse width of the laser, the stronger the delaminating force.

$$F \propto I/t_p^2 \quad \text{[Equation 1]}$$

In Equation 1 above, F refers to a delaminating force of the conductive layer from the base substrate, I refers to an intensity of the irradiating laser, and $t_p$ refers to a pulse width of the irradiated laser.

A change of volume according to a temperature change may be quantified by a coefficient of thermal expansion (CTE), and may vary according to the thickness of each component, the manufacturing company, the product quality, the pulse width of an irradiated laser, and the energy of the irradiating laser. Further, when the coefficient of thermal expansion of the substrate is higher than the coefficient of thermal expansion of the conductive layer, the conductive layer and the liquid crystal alignment film may be smoothly delaminated by the irradiating laser.

According to an exemplary embodiment of the present invention, a step of exposing one area of the substrate is performed by further providing an etching mask on the large area liquid crystal device, and then removing an etching mask together with residues of the etched liquid crystal alignment film and conductive layer by irradiating the laser.

That is, after disposing the liquid crystal alignment film on the large area liquid crystal device, when the laser is irradiating to delaminate the conductive layer and the liquid crystal alignment film from the substrate, the shape of the separated cross-section may be smoothly formed without being bent.

Further, the etching mask may be freely selected from etching masks known in the art and a type thereof is not limited.

Figure 7:
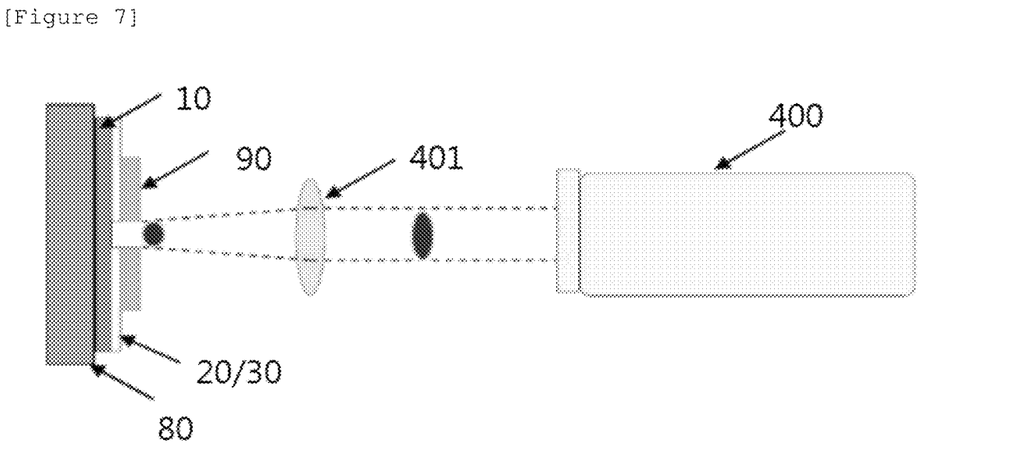
FIG. 7 illustrates a schematic view of a method of forming patterns for a large area liquid crystal device according to an exemplary embodiment of the present invention.

FIG. 7 illustrates a schematic diagram of a method of forming patterns for a large area liquid crystal device according to an exemplary embodiment of the present invention.

Specifically, referring to FIG. 7, a method of forming patterns according to an exemplary embodiment of the present invention prepares a lamination in which a substrate 10, a conductive layer 20, and a liquid crystal alignment film 30 are sequentially provided on a linear stage 80. An etching mask 90 is provided on the large area liquid crystal device, and then a Q switching IR laser 400 irradiates from the liquid crystal alignment film toward the conductive layer to separate one area of the conductive layer and the liquid crystal alignment film to expose one area of the substrate. In this case, a lens 401 is provided between the Q switching IR laser and the large area liquid crystal device to adjust a beam diameter of the irradiated laser.

According to an exemplary embodiment of the present invention, the large area liquid crystal device may be used for a automobile sunroof, a smart window, a privacy window, or a variable transmittance film. That is, the method of forming patterns for a large area liquid crystal device according to an exemplary embodiment of the present invention may be applied to large area liquid crystal devices having various sizes.

EXAMPLES

Hereinafter, the present invention will be described in detail through Examples. However, the Examples according to the present invention may be modified in various forms, and the scope of the present invention is not interpreted as being limited to the Examples described below. The Examples of the present specification are provided for more completely explaining the present invention to those skilled in the art.

Calculating Tact Time of the Delaminating Process

Comparative Example 1

A large area liquid crystal device in which a PET film having a thickness of 125 μm as a substrate, an ITO film having a thickness of 40 nm as a conductive layer, and an acrylate polymer based photo alignment film including a cinnamate functional group having a thickness of 0.3 to 0.5 mm as a liquid crystal alignment film are sequentially provided was prepared.

One area of the liquid crystal alignment film and the conductive layer was removed by irradiating with a Yb fiber laser (70 W, produced by IPG Photonics Corporation) having an etching interval of 38 μm, a repetition frequency of 40 kHz, a scanning velocity of 2000 mm/s, and a beam diameter of 40 μm, applied to the large area liquid crystal device to form a pattern in the large area liquid crystal device.

Example 1

One area of the liquid crystal alignment film and the conductive layer was removed by irradiating with a Q switching IR laser having a repetition frequency of 10 Hz, a pulse width of 6 ns, energy per pulse of 0.85 J, and a beam diameter of 6 mm, applied to the same large area liquid crystal device prepared in Comparative Example 1 using a Q switching IR laser (wavelength is 1064 nm and a product name is Q-smart 850) irradiating device to form a pattern in the large area liquid crystal device.

In this case, the beam diameter was adjusted using a lens and an aluminum etching mask having a thickness of 3.0 mm to which an aluminum foil having a thickness of 15 μm was attached with a general purpose double sided tape was provided to the large area liquid crystal device before irradiating the laser.

Figure 8:
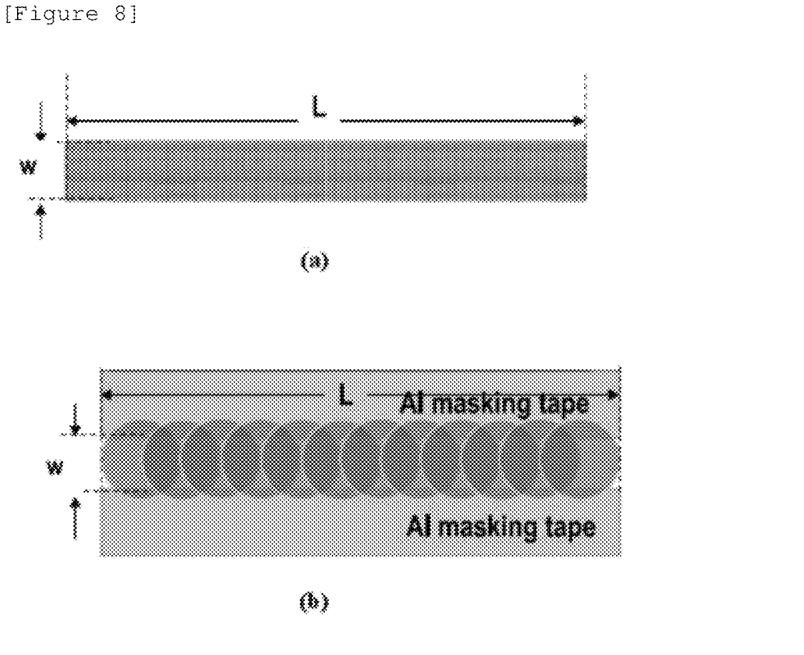
FIG. 8 illustrates a laser irradiating method of Example 1 and Comparative Example 1.

FIG. 8 illustrates a laser irradiating method of Example 1 and Comparative Example 1.

FIG. 8A illustrates a rectangular separating area having a predetermined length L and a line width W according to Comparative Example 1 and FIG. 8B illustrates that a rectangular separating area having a predetermined length L and a line width W according to Example 1 is divided by the aluminum etching mask.

Figure 9:
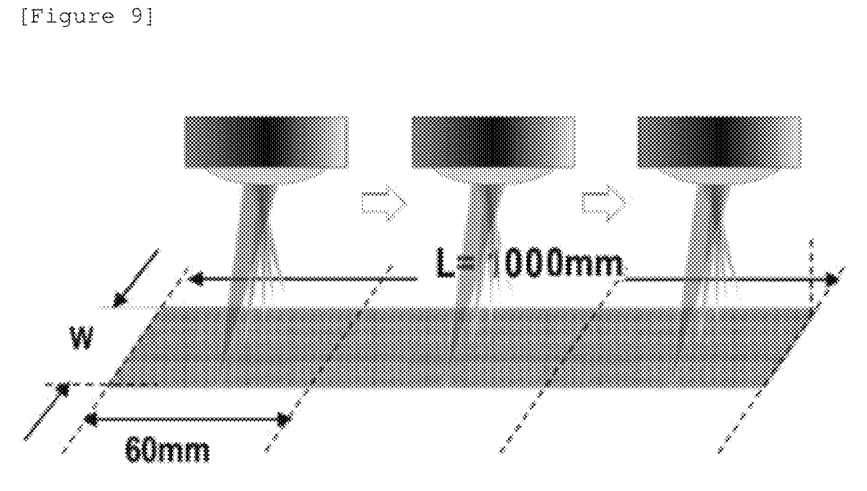
FIG. 9 illustrates a laser irradiating method of Comparative Example 1 in more detail.

Further, FIG. 9 illustrates a laser irradiating method of Comparative Example 1 in more detail. An irradiating direction of the laser was changed along a moving direction of the line width W while moving the Yb fiber laser 30 used in Comparative Example 1 in a lengthwise direction (L) to perform a delaminating process.

Tact times according to line widths (W=2 mm, 3 mm, 4 mm, and 5 mm) of the delaminating process of Example 1 and Comparative Example 1 were calculated.

Specifically, in Comparative Example 1, a transferring time (approximately, 2.5 seconds) of the Yb fiber laser was considered and a tact time of the delaminating process of Comparative Example 1 was calculated by "number of repetitions X time for one-time scanning" as represented in the following Equation 2.

The "number of repetitions" was represented by "length/etching interval (L/$W_{hatching}$)" in Equation 2 and the "time for one-time scanning" was represented by "line width/scanning velocity (w/$v_{scan}$)" in Equation 2.

$$\text{Tact time}=(L/W_{hatching}) \times (w/v_{scan}) \quad \text{[Equation 2]}$$

Further, the tact time of the delaminating process of Equation 1 was "distance between single emitted beams in consideration of delaminating width/repetition velocity" and calculated as represented in Equation 3.

The "distance between single emitted beams in consideration of delaminating width" was denoted by "L" in Equation 3 and the "repetition velocity" was represented by "$f \cdot (D^2-W^2)^{0.5}$" in Equation 3.

$$\text{Tact time}=L/\{f \cdot (D^2-W^2)^{0.5}\} \quad \text{[Equation 3]}$$

In Equation 3, f denotes a repetition frequency of laser and D denotes a beam diameter of the laser.

Figure 10:
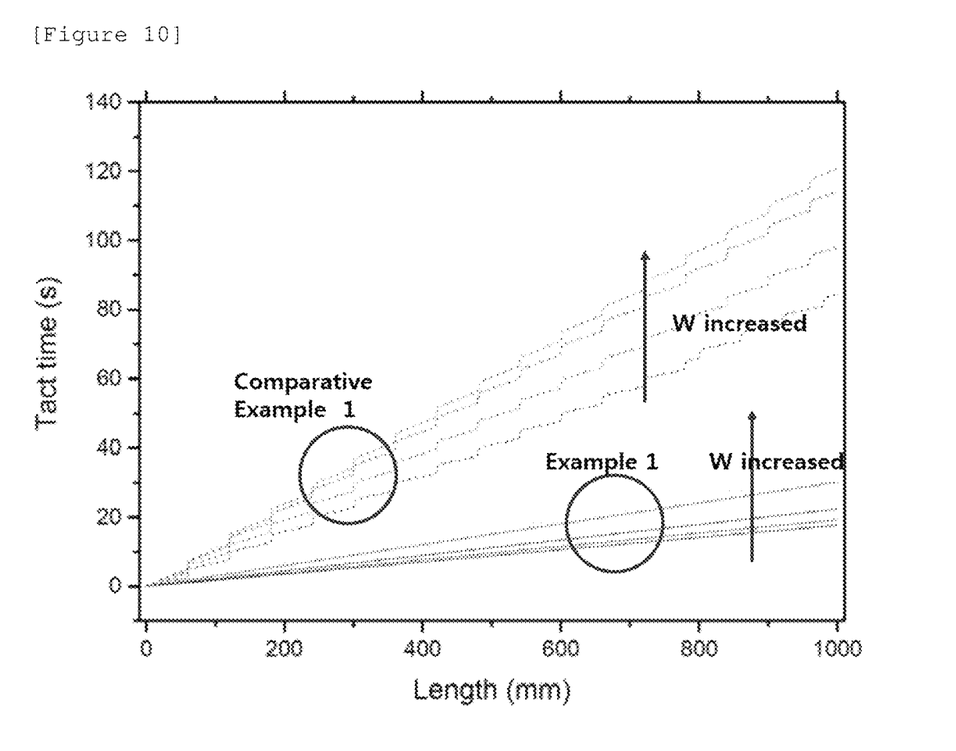
FIG. 10 illustrates a processing time in a predetermined line width of Example 1 and Comparative Example 1.

A tact time for the process according to a length L of a delaminating area in a predetermined line width w of Example 1 and Comparative Example 1 is illustrated in FIG. 10 and a tact time for the process when a length of the delaminating area is 1000 mm is specifically represented in Table 1.

TABLE 1

| L = 1,000 mm | W = 2 mm | W = 3 mm | W = 4 mm | W = 5 mm |
| --- | --- | --- | --- | --- |
| Comparative Example 1 | 84.3 s | 97.94 s | 114.10 s | 120.72 s |
| Example 1 | 17.68 s | 19.25 s | 22.36 s | 30.15 s |

Referring to FIG. 10, it was confirmed that in Example 1, a tact time for a process for obtaining a delaminating area with a predetermined line width was not significantly increased, even though a length of the delaminating area was increased. However, in Comparative Example 1, as the length of the delaminating area was increased, a tact time for a process was significantly increased.

Also in Table 1 when the length of the delaminating area is 1000 mm, it was confirmed that a tact time according to the same line width in Example 1 was much shorter than that of Comparative Example 1 (approximately a 4 to 5.1 times reduction).

By doing this, it was confirmed that when irradiating with a laser was irradiated using the conditions according to the exemplary embodiment of the present invention, a time for a pattern forming process of a large area liquid crystal device was significantly shortened and thus economic efficiency in the manufacturing process of a liquid crystal device may be attained.

Further, it was confirmed that in Example 1, since a laser having a relatively large beam diameter was used for irradiation, laser scanning velocity and overlap between beams needed to be optimized. Specifically, it was confirmed that the overlap of the laser according to the line width W and the beam diameter D needed to be minimized and the laser scanning velocity needed to be maximized.

Figure 11:
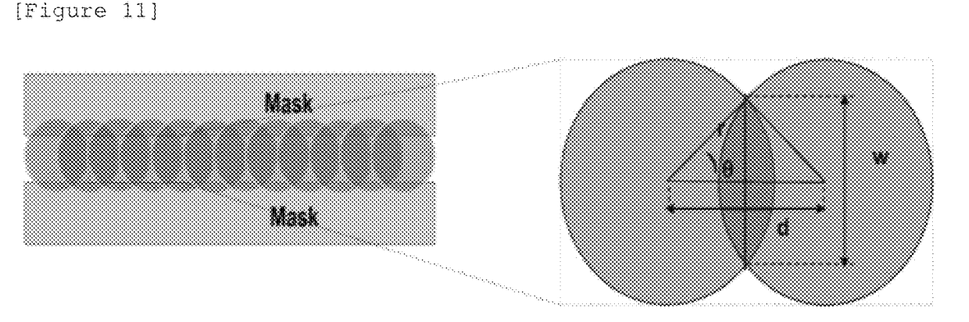
FIG. 11 illustrates a laser irradiating method of Example 1 in more detail.

Specifically, FIG. 11 illustrates a schematic diagram of an overlap of a laser beam when irradiating with a laser similar to Example 1.

Referring to FIG. 11, a line width W is represented by $2r \cdot \sin \theta$ and a laser repetition interval d is represented by $2r \cdot \cos \theta$. By doing this, the laser repetition interval d may be represented by "$(D^2-W^2)^{0.5}$".

By doing this, a ratio of an overlap area between irradiating laser beams (overlap, unit is %) may be represented by "1−(d/D)×100" and when the above-described equation of laser repetition interval d is applied, the overlap may be represented by "$[1-\{(D^2-W^2)^{0.5}/D\}] \times 100$".

Further, the scanning velocity v of the laser may be obtained by "laser repetition interval X laser repetition frequency" so that the scanning velocity of the laser may be obtained through an equation represented by "$f \cdot (D^2-W^2)^{0.5}$".

Therefore, when a line width to be delaminated is determined, a minimum overlap between laser beams for implementing the line width and a highest scanning velocity at this time may be obtained as the overlap and the scanning velocity of the laser.

Figure 12:
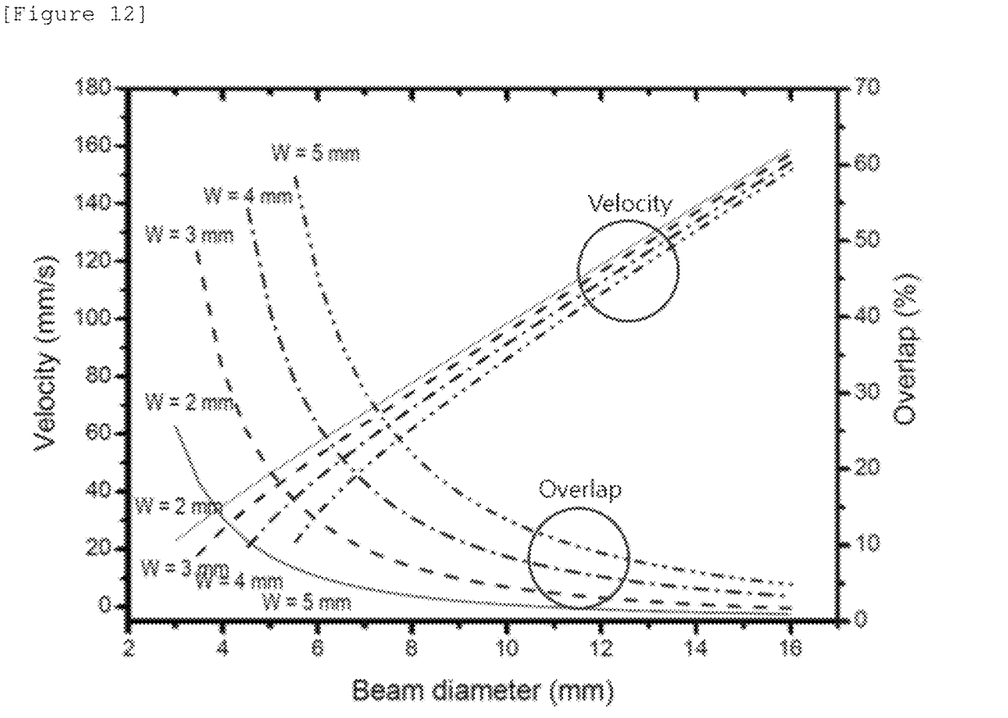
FIG. 12 illustrates graphs of a minimum overlap and a highest scanning velocity according to a beam size in a predetermined line width of Example 1.

A graph of the minimum overlap according to the beam size and the scanning velocity according to the above-described method is illustrated in FIG. 12.

Referring to FIG. 12, when the line width of the delaminating area is determined, the minimum overlap and the highest scanning velocity may be obtained according to the diameter of the irradiating beam.

In FIG. 12, for example, when a line width is determined to be 5 mm, if the diameter of the irradiating beam is 8 mm, it was confirmed that the minimum overlap is approximately 25% and the maximum scanning velocity is approximately 60 mm/s.

Separating Experiment According to Change of Diameter of Beam

Examples 2 to 6

A large area liquid crystal device in which a PET film having a thickness of 125 μm as a substrate, an ITO film having a thickness of 40 nm as a conductive layer, and an acrylate polymer based photo alignment film including a cinnamate functional group having a thickness of 0.3 to 0.5 mm as a liquid crystal alignment film are sequentially provided was prepared.

One area of the liquid crystal alignment film and the conductive layer was removed by irradiating a Q switching IR laser having a repetition frequency of 10 Hz, a pulse width of 6 ns, energy per pulse of 0.75 J, and beam diameters of 4.0 mm (Example 2), 5.0 mm (Example 3), 6.0 mm (Example 4), 7.0 mm (Example 5), and 9.0 mm (Example 6) to the large area liquid crystal device using a Q switching IR laser (wavelength is 1064 nm and a product name is Q-smart 850) irradiating device to form a pattern in the large area liquid crystal device.

Figure 13:
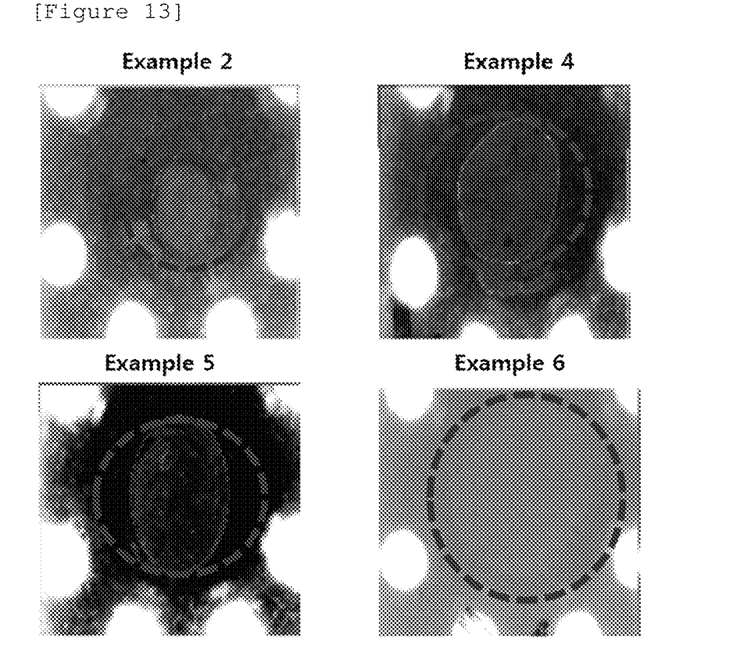
FIG. 13 is an image obtained by photographing a surface of a large area liquid crystal device according to Examples 2, and 4 to 6 using an optical microscope.

Images obtained by photographing surfaces of the large area liquid crystal devices according to Examples 2, 4 to 6 using an optical microscope (Eclipse L300ND by Nikon) are illustrated in FIG. 13.

Referring to FIG. 13, it was confirmed that an area where the liquid crystal alignment film and the conductive layer were delaminated by irradiating the Q switching IR laser and an area where the liquid crystal alignment film and the conductive layer were not delaminated were distinctly distinguished (distinguished by a dotted line circle of FIG. 13). Therefore, it was confirmed that only when the laser having a range of beam diameters according to an exemplary embodiment of the present invention was irradiated, the liquid crystal alignment film and the conductive layer were sufficiently delaminated while reducing damage of the substrate. It was further confirmed that in Example 6 in which the irradiated beam diameter was 9 mm, the conductive layer was not satisfactorily delaminated as compared with Examples 2 to 5 in which the beam size was relatively small.

Further, it was confirmed that when the substrate was a PET film and the conductive layer includes ITO, as a result of calculating an energy density per unit area required to delaminate the conductive layer from the substrate, the energy density was 2.13 J/cm$^2$ or higher.

By doing this, it was confirmed that only when a Q switching IR laser having a minimum energy density of 2.13 J/cm$^2$ was irradiated, the conductive layer may be separated from the substrate (PET film).

Figure 14:
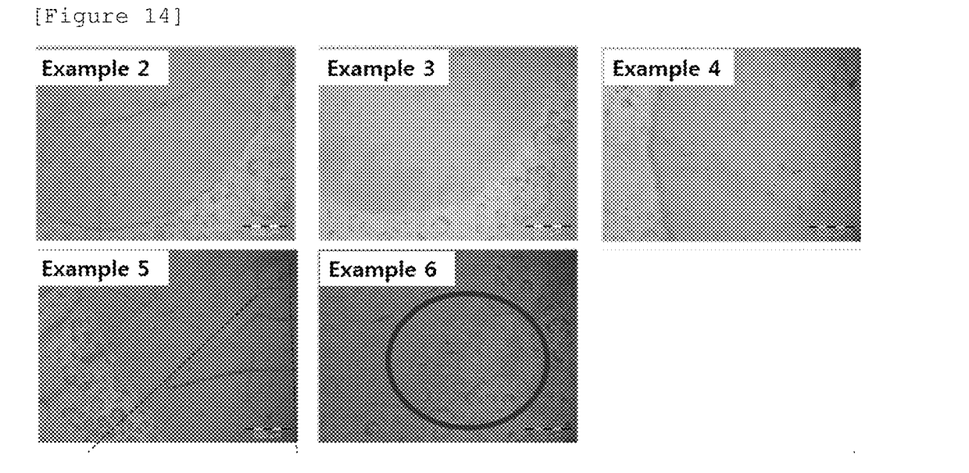
FIG. 14 is an enlarged view of an image obtained by photographing a surface of a large area liquid crystal device according to Examples 2 to 6 using an optical microscope.

Further, enlarged views of images obtained by photographing surfaces of the large area liquid crystal devices according to Examples 2, 4 to 6 using an optical microscope (Eclipse L300ND by Nikon) are illustrated in FIG. 14.

Referring to FIG. 14, it was confirmed that in Example 6 in which the beam size was 9 mm, an interface of the delaminating area was not distinct as compared with Examples 2 to 5 in which the beam size was relatively small.

In summary, when the substrate was a PET film, it was confirmed that in order to delaminate the ITO conductive layer from the substrate, a 2.13 J or higher laser energy per unit area (cm$^2$) is needed for irradiation. It was further confirmed that in order to implement such a laser energy density, a laser having a beam diameter of less than 9 mm was needed for irradiation.

Examples 7 and 8

A large area liquid crystal device in which a COP film having a thickness of 40 μm as a substrate, an ITO film having a thickness of 40 nm as a conductive layer, and an acrylate polymer based photo alignment film including a cinnamate functional group having a thickness of 0.3 to 0.5 mm as a liquid crystal alignment film are sequentially provided was prepared.

One area of the liquid crystal alignment film and the conductive layer was removed by irradiating a Q switching IR laser having a repetition frequency of 10 Hz, a pulse width of 6 ns, energy per pulse of 0.75 J, and beam diameters of 7.0 mm (Example 7) and 9.0 mm (Example 8) to the large area liquid crystal device using a Q switching IR laser (wavelength is 1064 nm and a product name is Q-smart 850) irradiating device to form a pattern in the large area liquid crystal device.

Figure 15:
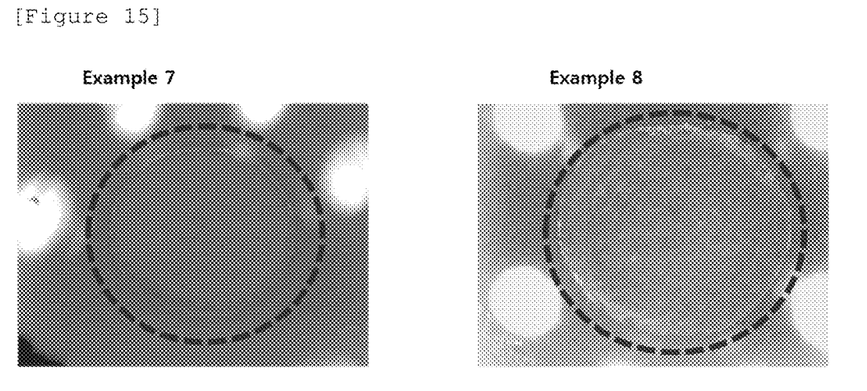
FIG. 15 is an image obtained by photographing a surface of a large area liquid crystal device according to Examples 7 and 8 using an optical microscope.

Images obtained by photographing surfaces of the large area liquid crystal devices according to Examples 7 and 8 and using an optical microscope (Eclipse L300ND by Nikon) are illustrated in FIG. 15.

Referring to FIG. 15, it was confirmed that an area where the liquid crystal alignment film and the conductive layer were delaminated by irradiating the Q switching IR laser and an area where the liquid crystal alignment film and the conductive layer were not delaminated were distinctly distinguished (distinguished by a dotted line circle of FIG. 15). Therefore, it was confirmed that only when the laser having a range of a beam diameter according to the exemplary embodiment of the present invention was used for irradiation, the liquid crystal alignment film and the conductive layer were sufficiently delaminated while reducing damage of the substrate.

Further, in this case, it was confirmed that when the substrate was a COP film and the conductive layer includes ITO, as a result of calculating an energy density per unit area required to delaminate the conductive layer from the substrate, the energy density was 1.1 J/cm$^2$ or higher. By doing this, it was confirmed that only when a Q switching IR laser having a minimum energy density of 1.1 J/cm$^2$ was used for irradiation, the conductive layer may be delaminated from the substrate (COP film) to form a pattern on the large area liquid crystal device.

Experiment Using Etching Mask

Example 3-1

A pattern was formed on the large area liquid crystal device by the same method as Example 3 except that an aluminum etching mask having a thickness of 3.0 mm to which an aluminum foil having a thickness of 15 μm was attached with a general purpose double sided tape. The mask was provided in the larger size liquid crystal device before irradiating with the laser.

Example 7-1

A pattern was formed on the large area liquid crystal device by the same method as Example 7 except that an aluminum etching mask having a thickness of 3.0 mm to which an aluminum foil having a thickness of 15 μm is attached with a general purpose double sided tape. The mask was provided in the larger size liquid crystal device before irradiating with the laser.

Figure 16:
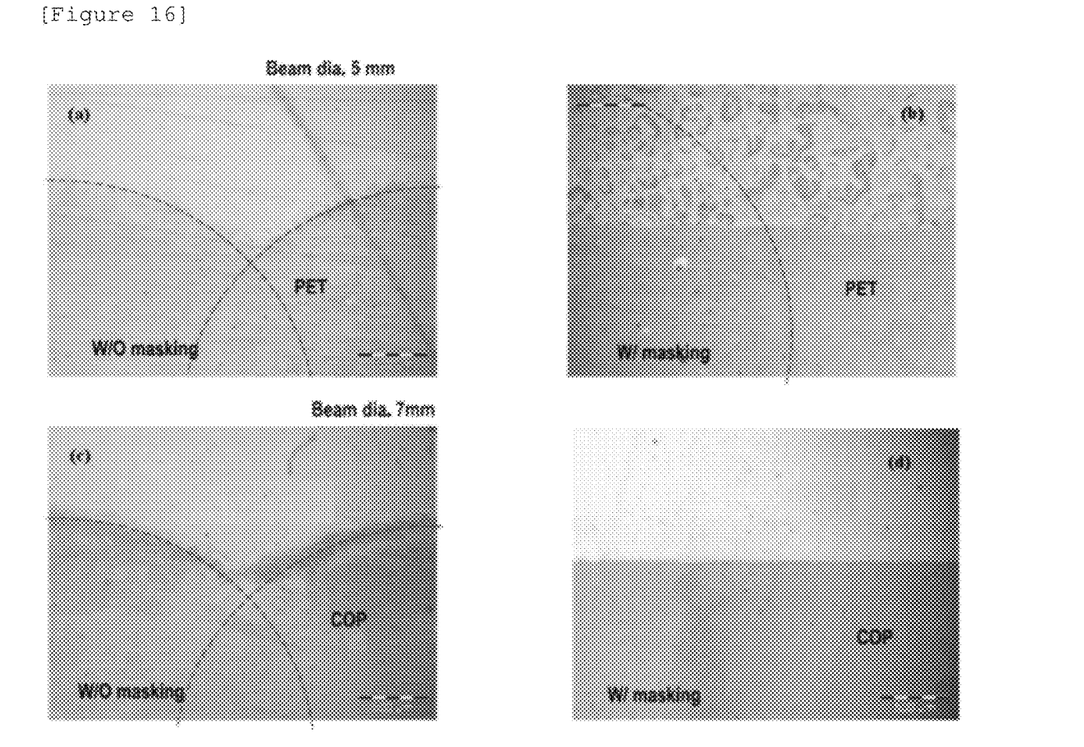
FIG. 16 is an image obtained by photographing a surface of a large area liquid crystal device of Examples 3, 3-1, 7 and 7-1 using an optical microscope.

Images obtained by photographing surfaces of the large area liquid crystal devices according to Examples 3, 3-1, 7, and 7-1 using an optical microscope (Eclipse L300ND by Nikon) are illustrated in FIG. 16.

Specifically, FIGS. 16A, 16B, 16C, and 16D are optical microscope images of surfaces of the large area liquid crystal devices according to Examples 3, 3-1, 7, and 7-1, respectively.

Referring to FIGS. 16A and 16B, upper portions represent portions which are not delaminated and lower portions represent portions where the substrate (PET film) is exposed. Referring to FIGS. 16C and 16D, upper portions represent portions which are not delaminated and lower portions represent portions where the substrate (COP film) is exposed.

Referring to FIGS. 16A and 16B, it was confirmed that an etched area of the surface of the large area liquid crystal device including an etching mask according to Example 3-1 was smoother than an etched area of the surface of the large area liquid crystal device which did not include an etching mask according to Example 3.

Further, referring to FIGS. 16C and 16D, it was confirmed that an etched area of the surface of the large area liquid crystal device including an etching mask according to Example 7-1 was smoother than an etched area of the surface of the large area liquid crystal device which does not include an etching mask according to Example 7.

Figure 17:
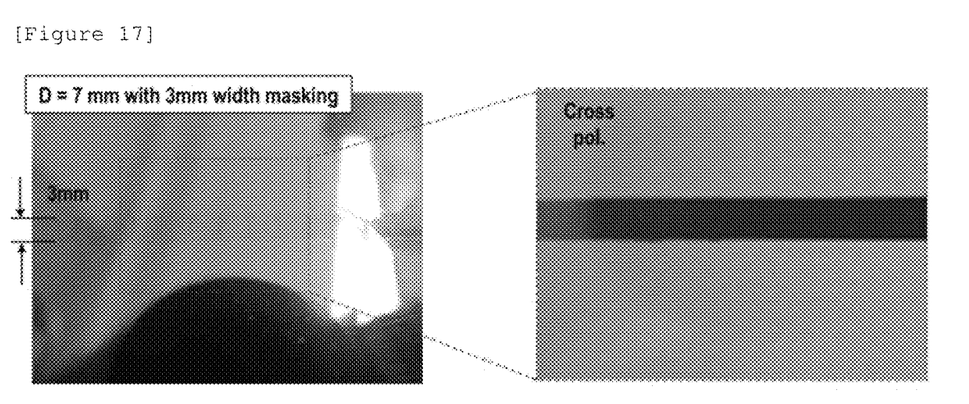
FIG. 17 is a digital camera image of a surface of a large area liquid crystal device of Example 7-1 and an image obtained by photographing the surface using an optical microscope.

A digital camera image and an image photographed by an optical microscope (Eclipse L300ND by Nikon) of a surface of the large area liquid crystal device according to Example 7-1 are illustrated in FIG. 17.

Referring to FIG. 17, it can be visually confirmed that an etched area of the surface of the large area liquid crystal device including an etching mask according to Example 7-1 is smoothly formed, which may be more apparent from the image photographed by the optical microscope by enlarging the surface of the large area liquid crystal device.

In summary, it is understood that when the conductive layer and the liquid crystal alignment film are delaminated under the laser irradiating condition according to an exemplary embodiment of the present invention, a delaminated area and a non-delaminated area may be smoothly distinguished and when the etching mask is provided before irradiating the laser, the delaminated area and the non-delaminated area may be more distinctly distinguished.

EXPLANATION OF REFERENCE NUMERALS AND SYMBOLS

10: substrate
20: Conductive layer
30: Liquid crystal alignment film
40: Liquid crystal
50: Spacer
60: Sealant
70: Polarizer
80: Linear stage
90: Etching mask
100: Large area liquid crystal device
200: Display device
300: Laser used for manufacturing method of related art
400: Q Switching laser.

The invention claimed is:

1. A method of forming patterns for a liquid crystal device, comprising:
providing the liquid crystal device with a substrate, a conductive layer provided on the substrate, and a liquid crystal alignment film on the conductive layer; and
exposing one area of the substrate by delaminating one area of the conductive layer and the liquid crystal alignment film by irradiating the one area with a laser;
wherein the laser irradiates the one area from the liquid crystal alignment film toward the conductive layer and the laser is a Q switching IR laser having a beam diameter of 1 mm or larger and 16 mm or smaller, and an energy per pulse of 0.05 J or higher and 2.5 J or lower.

2. The method of claim 1, wherein the substrate is a polycarbonate film, a colorless polyimide film, a polyethylene terephthalate film, or a cyclo olefin polymer film.

3. The method of claim 1, wherein the conductive layer is an indium tin oxide film.

4. The method of claim 1, wherein the liquid crystal alignment film includes at least one of a monomolecular compound, a monomeric compound, an oligomeric compound, and a polymeric compound.

5. The method of claim 1, wherein the energy per pulse of the laser is 0.3 J or higher and 1.5 J or lower.

6. The method of claim 1, wherein the beam diameter of the laser is 4 mm or larger and 9 mm or smaller.

7. The method of claim 1, wherein a repetition frequency of the laser is 1 Hz or higher and 10 Hz or lower.

8. The method of claim 1, wherein a pulse width of the laser is 1.0 ns or longer and 10.0 ns or shorter.

9. The method of claim 1, wherein the exposing one area of the substrate is performed with volume expansion driven delamination of the conductive layer from the substrate.

10. The method of claim 1, wherein the exposing one area of the substrate is performed by further providing an etching mask on the liquid crystal device and then removing the etching mask together with residues of the etched liquid crystal alignment film and conductive layer by irradiating the laser.

11. The method of claim 1, further comprising incorporating the liquid crystal device into an automobile sunroof, a smart window, a privacy window, or a variable transmittance film.

* * * * *